(12) United States Patent
Kassel et al.

(10) Patent No.: US 9,124,394 B2
(45) Date of Patent: Sep. 1, 2015

(54) PHYSICAL CHANNEL BUNDLING IN DATA TRANSMISSION

(75) Inventors: Pidder Kassel, Oberhaching (DE); Friedrich Beckmann, Nuremberg (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 358 days.

(21) Appl. No.: 12/354,788

(22) Filed: Jan. 16, 2009

(65) Prior Publication Data

US 2010/0080250 A1  Apr. 1, 2010

Related U.S. Application Data

(60) Provisional application No. 61/101,158, filed on Sep. 30, 2008.

(51) Int. Cl.
*H04L 12/951* (2013.01)
*H04L 1/00* (2006.01)
*H04L 1/06* (2006.01)

(52) U.S. Cl.
CPC ............ *H04L 1/0041* (2013.01); *H04L 1/0071* (2013.01); *H04L 1/0643* (2013.01)

(58) Field of Classification Search
None
See application file for complete search history.

(56) References Cited

U.S. PATENT DOCUMENTS

| | | | |
|---|---|---|---|
| 5,949,788 A | 9/1999 | Friedman et al. | |
| 2002/0093938 A1* | 7/2002 | Tourunen | 370/349 |
| 2003/0031149 A1* | 2/2003 | Odenwalder et al. | 370/337 |
| 2003/0072311 A1* | 4/2003 | Pfeiffer | 370/395.1 |
| 2003/0169780 A1* | 9/2003 | Kukic | 370/535 |
| 2004/0141530 A1* | 7/2004 | Spio | 370/535 |
| 2005/0180314 A1* | 8/2005 | Webster et al. | 370/208 |
| 2006/0285549 A1* | 12/2006 | Beckmann | 370/435 |
| 2008/0008152 A1* | 1/2008 | Lohr et al. | 370/342 |

FOREIGN PATENT DOCUMENTS

DE   102007022704 A1   11/2008

OTHER PUBLICATIONS

IEEE 802.11 Standard in 2007, Part 11: Wireless LAN Mac and phy specifications, p. 251.
IEEE 802.11n Draft Standard Sep. 2008, D7.0 Transmitter, p. 261.

* cited by examiner

Primary Examiner — Zewdu A Beyen

(57) ABSTRACT

Embodiments related to bundling of data streams in data communication are described and depicted.

20 Claims, 6 Drawing Sheets

PHYSICAL CHANNEL BUNDLING IN DATA TRANSMISSION

BACKGROUND

Data communication becomes increasingly important in business as well as at home. For example, distribution of video, TV and voice data at home or in the office is becoming more and more popular. To address this trend, high data rate and QoS for any kind of wired as well as wireless data connection is essential. The achievable data rate within one physical channel decreases with the increase of disturbers and the distance to be bridged, i.e. the above mentioned services may not be distributable via one physical channel with the appropriate quality to receivers which exceed a certain distance to the service distributor.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices circuits etc. may have assigned the same reference number.

Figure 1:
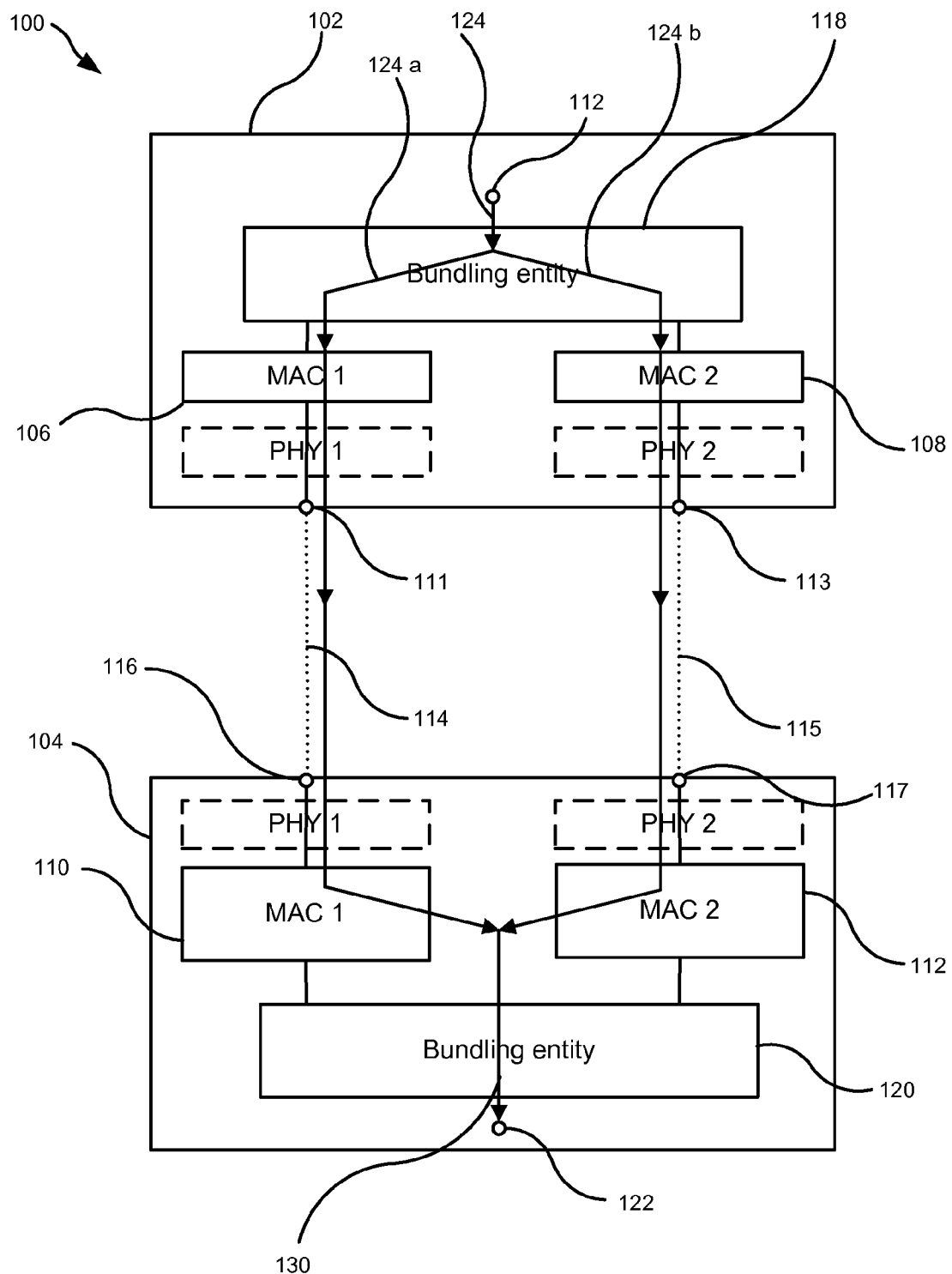
FIG. 1 shows a block diagram according to an embodiment of the present invention.

FIG. 1 shows an exemplary embodiment of a data communication system 100. The data communication system has a transmitter 102 and a receiver 104. Transmitter 102 and receiver 104 can be implemented as transceiver i.e. may be capable of transmitting and receiving. Transmitter 102 and receiver 104 may be implemented on chips using only hardware or using hardware in combination with firmware. The data communication system 100 provides a transmission of data from the transmitter by bundling at least two physical channels 114 and 115. The physical channels 114 and 115 or one of the physical channels 114 and 115 may be physical channels of a shared transmission medium such as a transmission medium of a WLAN (wireless local area network). The physical channels 114 and 115 or one of the physical channels 114 and 115 may in an embodiment be a frequency channel of a plurality of frequency channels, a frequency band of a plurality of frequency bands, a wired transmission line, or a predetermined timeslot of a time division communication etc. For example, in one embodiment, the physical channels may be physical channels of a home network including WLAN frequency channels or WLAN frequency bands, wired channels such as an Ethernet cable connection, a copper wire connection etc. In one embodiment at least one of the physical channels utilizes MIMO operation. In another embodiment, each of the bundled physical channels utilizes a MIMO operation on this channel.

The physical channels bundled to transfer the data stream may be physical channels of different media. In embodiments, one physical channel may be a wired channel while the other physical channel in the bundling is a wireless physical channel such as a WLAN physical channel. In embodiments, the first and second physical channel may be a WLAN channel of a plurality of WLAN channels or a WLAN frequency band of a plurality of WLAN frequency bands.

Bundling of the physical channels is provided in embodiments such that the transmission of data of one partial stream over one physical channel within the bundle is independent from the transmission of data of another partial stream over another physical channel of the bundled physical channels. According to embodiments, independency of the data transmission is provided within the transmitter and the receiver for each of the physical channels by separate MAC entities processing at least a part of the MAC processing required for the transmission.

FIG. 1 shows therefore the transmitter 102 having two separate MAC (media access control) entities 106 and 108 and the receiver 104 having two separate MAC entities 110 and 112 which operate to provide at least a part of the entire MAC processing required for the data transmission over the two physical channels 114 and 115.

Transmitter 102 has an input 112 to receive a data stream to be transmitted to the receiver 104. The data stream may for example be a data stream coming from a distribution network for example a data stream from a router or switch, a data stream coming from a network exchange device etc. The data stream may comprise data units such as MSDUs (MAC service data units) or other data units. The transmitter 102 has a bundling entity 118 configured to fragment the data stream received at input 112 into fragments. The fragments are distributed to the MAC entities 106 and 108 such that first fragments are distributed to the MAC entity 106 and second fragments are distributed to the MAC entity 108. The MAC entity 106 provides then at least a part of the MAC processing for the first fragments and the MAC entity 108 provides at least a part of the MAC processing for the second fragments. As described above, the MAC entities 106 and 108 are further configured to provide the MAC processing by the first MAC entity independent from the MAC processing by the second MAC entity. Independent processing includes in one embodiment that the transmission time of the separated first and second fragments is scheduled independently, i.e. the first fragments are transmitted independent whether the second channel is also available for transmission or not and the second fragments are transmitted independent whether the first channel is available for transmission or not.

For transmitting the fragments over the physical channels 114 and 115, the MAC entities 106 and 108 are coupled to respective outputs 111 and 113. Outputs 111 and 113 may include for example radio circuits to modulate the transmission data on a carrier signal, transformers to transmit the signal on a wire etc. Furthermore, it is to be understood that between the MAC entities 106, 108 and the outputs 111, 113 other components or entities required for the specific type of transmission on the respective physical channel may be provided. For example, a PHY layer (Physical layer) entity may be arranged for each physical channel between the MAC entities 106, 108 and the outputs to provide PHY layer processing as shown in FIG. 1 with dashed lines. It is to be understood that in embodiments any components or entities arranged between the MAC entity 106 and the output 111 perform independent from the components or entities arranged between the MAC entity 108 and the output 113.

The receiver 104 has an input 116 to receive from the first physical channel 114 the first fragments of the data stream transmitted from the transmitter 102 to the receiver 104 and an input 117 to receive from the second physical channel 115 the second fragments of the data stream. Similar to the transmitter 102, the MAC entity 110 in the receiver 104 provides at least a part of the MAC processing for the first fragments and a MAC entity 112 provides at least a part of the MAC processing for the second fragments independent from each other. Furthermore, a bundling entity 120 is provided in the receiver 104 which is configured to recombine the first and second fragments into a single data stream. The bundling entity 120 is coupled to an output 122 which provides the received data stream to data applications within the receiver, to other devices external the receiver, to a network coupled to the receiver etc.

Figure 3:
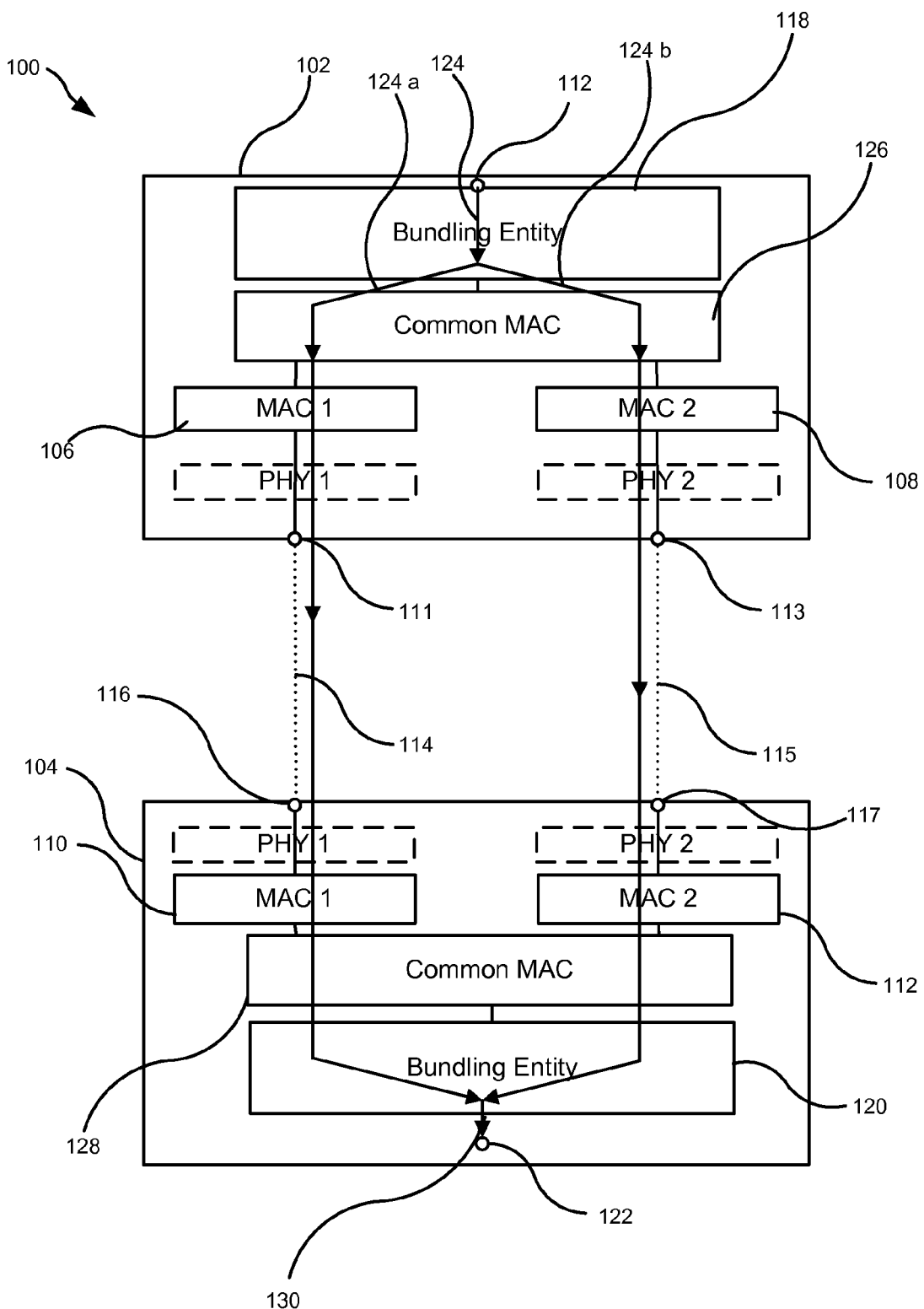
FIG. 3 shows a block diagram according to an embodiment of the present invention.

It is to be mentioned that in an embodiment the entire MAC processing for both physical channels may be provided separate for the two physical channels by the two MAC entities at the receiver and by the two MAC entities at the transmitter. In another embodiment, an upper part of the MAC processing may be performed common for both physical channels by a further common MAC entity 126 and 128 on top of the two separate MAC entities as shown in FIG. 3.

Figure 2:
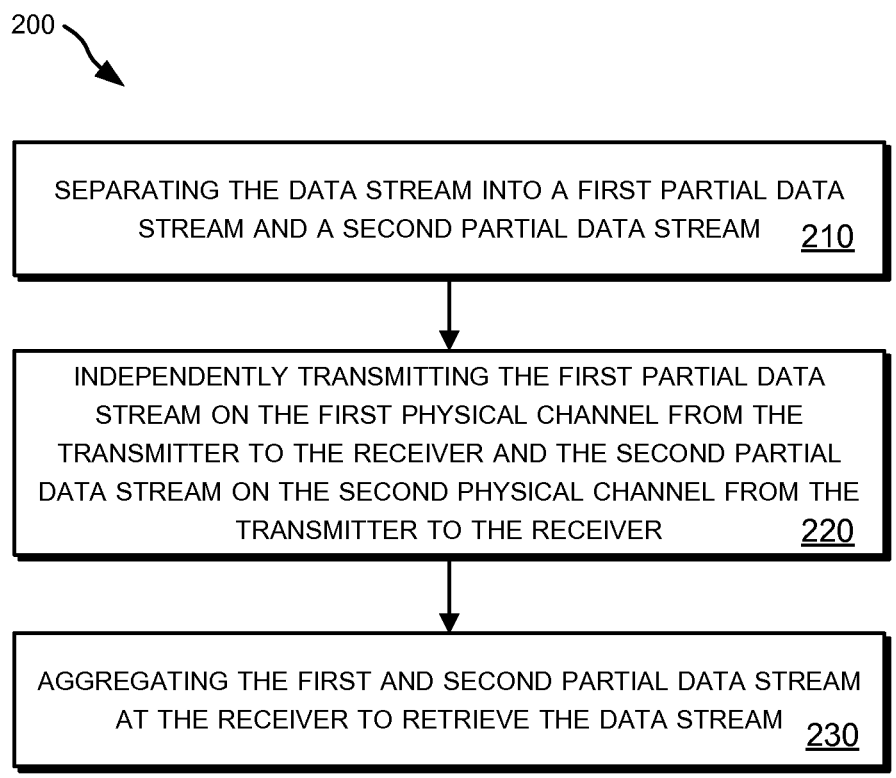
FIG. 2 shows a flow chart diagram according to an embodiment of the present invention.

A flow diagram 200 showing the bundling of the first and second physical channel is shown in FIG. 2. At 210, the data stream is separated into a first partial data stream and a second partial data stream. In embodiments, the separating into a first and second partial stream may be provided between the MAC layer and layer 3 (Network Layer) of the OSI model or at a sublayer of the MAC layer higher than the MAC extent sublayer. In the embodiment of FIG. 1, the data stream is shown with reference number 124 and the first and second partial data streams are shown with reference numbers 124a and 124b.

At 220, the first partial data stream is transmitted on the first physical channel from the transmitter to the receiver and the second partial data stream on the second physical channel from the transmitter to the receiver. As described above, transmitting of the first partial data stream on the first physical channel is provided independent from transmitting the second partial data stream on the second physical channel. At 230, the first and second partial data streams are aggregated at the receiver to retrieve the data stream at the receiver. The retrieved data stream is shown in FIG. 1 by reference number 130.

In an embodiment, determining whether the physical channel is occupied by a data transfer of another transmitter may be performed for each of the bundled physical channels. Determining whether the physical channel is occupied may include for example determining whether another station such as a WLAN station temporally transmits on the same physical channel or is assigned to transmit by a transmission scheduling. According to an embodiment, data are transmitted on the respective physical channels when availability is determined for the respective physical channel, i.e. the physical channel is not occupied by the data transmission of other devices or otherwise blocked. Data may be transmitted on this physical channel every time the first physical channel is not occupied. The detection of the availability of the channel may be for example contention-window based which is a technique used in existing WLAN systems.

The data may be transmitted in one of the channel independent of whether the other channel is available or not. This gives the flexibility of utilizing any of the bundled physical channels for transmitting fragments of the data stream as soon as the physical channel is not occupied by another device which provides a higher throughput for systems using a shared medium such as for example WLAN or allows to obtain a longer operating distance for the same throughput. At the receiver side, intermediate buffering of the fragments allows the independency of the transmission. Buffering may be provided until the complete other partial data stream has arrived on the receiver side and is ready for reassembly. In one embodiment, data transmitted on the first physical channel are packed into frames or packets. Embodiments may provide determining whether the first physical channel is occupied before each transmission of a frame or packet.

In one embodiment, the mode of operation may be switched from an independent transmission operation wherein the data are processed in the MAC layer entities independently as described above to a non-independent transmission mode. In the non-independent transmission mode, data are transmitted in the first and second physical channel only when both the first and second physical channel are not occupied by data transmission from at least one other transmitter of the network.

According to one embodiment, the fragments are indicated in order to provide for each fragment of the data an indication of the position in the data stream such that when aggregating the first and second partial stream the indication is used to aggregate the fragments with the correct order.

Figure 4:
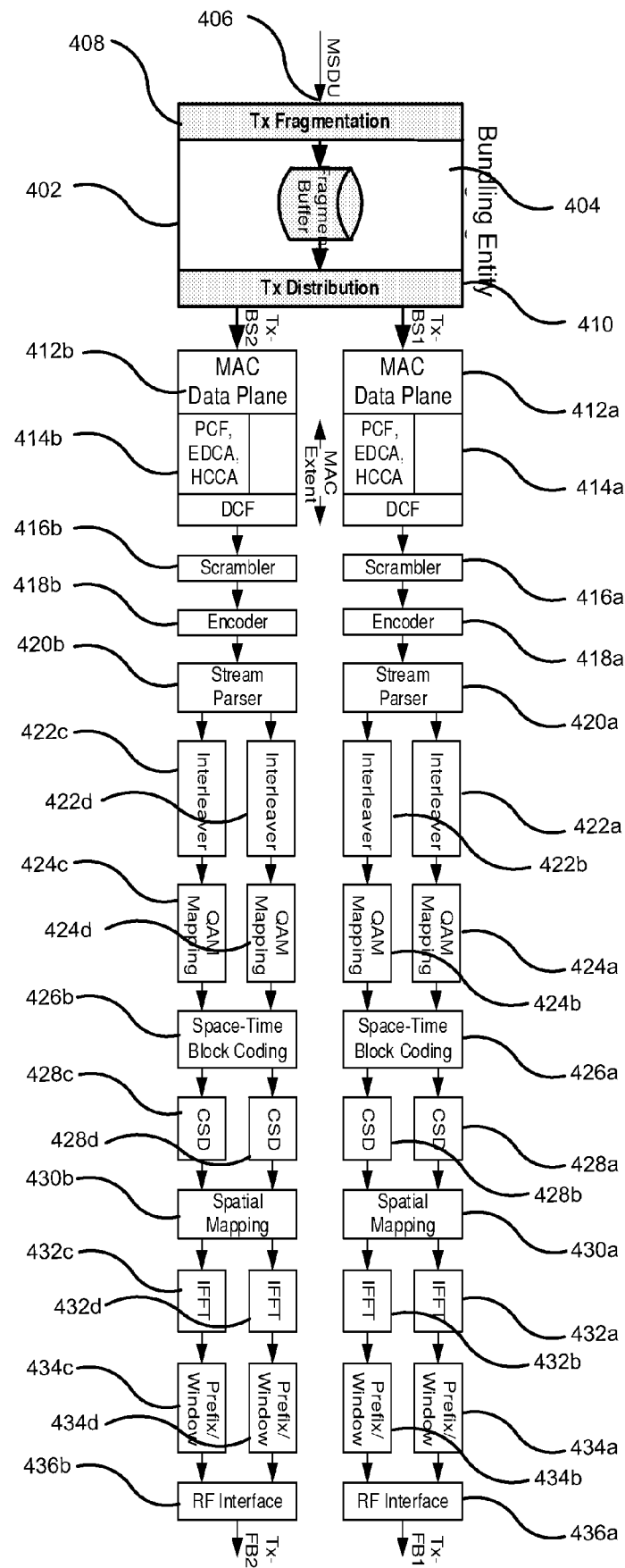
FIG. 4 shows a block diagram according to an embodiment of the present invention.

Referring now to FIG. 4, an embodiment of a bonding in a WLAN system is described. In this embodiment, two physical channels are utilized for bundling of one data stream. Furthermore, in this embodiment MIMO operation may be provided for each of the physical channels, i.e. each physical channel transmits by utilizing MIMO. FIG. 4 shows an input 406 where MSDUs (MAC service data units) which are to be transmitted are received at the bundling entity from a higher layer entity. The received MSDUs are fragmented at a fragmentation entity 408 and then provided to fragment buffers 402 and 404 for buffering the fragments when a physical channel is occupied. The fragments are then provided to a distribution entity 410 which distributes the received stream of fragments to two partial streams TX-BS1 and TX-BS2. The partial streams are then provided to MAC data plane entities 412a and 412b, respectively. Each of the MAC data plane entities 412a and 412b are operating independently. For example the MAC data plane entities 412a and 412b are able to receive and process the fragments to be transmitted at different time instances. The data plane entities 412a and 412b are one part of the MAC functionality provided for each of the physical channels. MAC extent entities 414a and 414b provide other MAC functionality such as PCF (point coordinating function), EDCA (Enhanced distributed channel access), and HCCA (HFC (Hybrid coordination function) controlled channel access). Furthermore, the MAC extent entities 414a and 414b provide DCF (distributed coordination functions) functionality for each of the separate MAC paths assigned to each physical channel. It is to be noted that the functionalities PCF, EDCA, HCCA and DCF are known to a person skilled in the art and are therefore not described in more detail herein.

From the MAC extent entities 414a and 414b the data stream is passed to the scrambler entities 416a and 416b, respectively. Encoding is then provided by encoding entities 418a and 418b, respectively, for securing the data. The two partial streams are then respectively parsed by stream parsers 420a and 420b into respectively two streams allowing to provide for each physical channel two MIMO streams which are transmitted to the receiver to implement for each physical channel a MIMO operation, for example a 2×2 MIMO operation. The two streams for the partial data stream TX-BS1 are then provided to interleaver entities 422*a* and 422*b* and the two streams for the partial data stream TX-BS2 are provided to interleaver entities 422*c* and 422*d*. QAM mapping is provided for the two streams of the partial data stream TX-BS1 by QAM mapper entities 424*a* and 424*b* and for the two streams of the partial data stream TX-BS2 by QAM mapper entities 424*c* and 424*d*. The two streams of the partial data stream TX-BS1 are then provided to a STBC entity 426*a* for providing space time block coding for the two streams of TX-BS1. The two streams of the data stream TX-BS2 are provided to a STBC entity 426*b* for providing space time block coding for the two streams of TX-BS2. CSD (cyclic shift diversity) processing is provided for the two streams of each partial data streams by CSD entities 428*a*-428*d*, respectively. Cyclic shift diversity is a transmit diversity technique which utilizes a signal spreading technique that spreads the spatial stream across multiple antennas by transmitting the signal on the multiple antennae with different phases. Spatial mapping for the two data streams of the partial data stream TX-BS1 may be provided by an entity 430*a* and spatial mapping for the two data streams of the partial data stream TX-BS2 may be provided by an entity 430*b*.

The two streams for each partial stream are then provided to IFFT (inverse Fast Fourier Transformation) entities 432*a*-*d* which provides conversion from the frequency domain to the time domain. Prefix/window processing is provided by entities 434*a*-*d*. The two streams of the partial data stream TX-BS1 are provided to a RF interface 436*a* which provides to the baseband signals from each chain to a radio circuit for mixing with a carrier signal for each of the two streams of TX-BS1. The two carrier modulated signals are then transmitted via two antennas to the receiver. Similar, the two streams of the partial data stream TX-BS2 are provided to a RF interface 436*b* which provides the base band signals to a radio circuit for mixing with a carrier signal. The two carrier modulated signals of the two streams are then transmitted via 2 antennas to the receiver.

At the receiver side, the same data flow in the reverse direction with reversed functionalities is provided. Persons skilled in the art will realize the implementation of the reversed data flow with reversed functionalities and therefore no further details are provided herein.

It is to be noted that the bundling entity at the transmitter site is configured to provide synchronization with the bundling entity at the receiver side. Furthermore, the bundling entity provides fragmentation of the received data and adds an identification to each fragment. In another embodiment, the fragmentation as standardized in the IEEE 802.11 may be used for providing the fragmentation. The bundling entity further distributes the fragments to the transmitter side data streams TX-BS1 and TX-BS2 assigned to the two physical channels which are bundled in the transmission. In one embodiment, the bundling entity is capable to be operated in two operation modes. In one operation mode, the fragments are transmitted whenever one of the physical channels which are used for bundling is ready to send. This independency of transmit scheduling is achieved by providing two separate and independent partial data streams throughout at least the MAC extent entities such that the MAC extent function can be executed independent for each physical channel. The second operation mode is an operation mode wherein the MAC extent function is executed for each of the partial data streams not independently, i.e. one MAC extent entity or synchronized MAC extent entities provides the processing for the bundled physical channel. It is to be noted, that the components or entities from the encoder entity to the RF interface entity may be identical to the components or entities used in a transmitter scheme according to IEEE 802.11n for MIMO operation. Hierarchically higher than the encoder entity, separate independent processing chains are provided corresponding to the number of physical channels to be bundled because it has to be ensured that the transmission is completely independent for all physical channels. As outlined above, the delayed transmission period of transmission on the first physical channel compared to transmission on the second physical channel or vice versa is compensated by Tx-Buffers 402 and 404 respectively.

At the receiver side, the bundling entity is configured to provide the synchronization with the bundling entity at the transmitter side. Furthermore, the bundling entity provides the de-fragmentation of the received partial data streams and generates the single output data stream.

Figure 5:
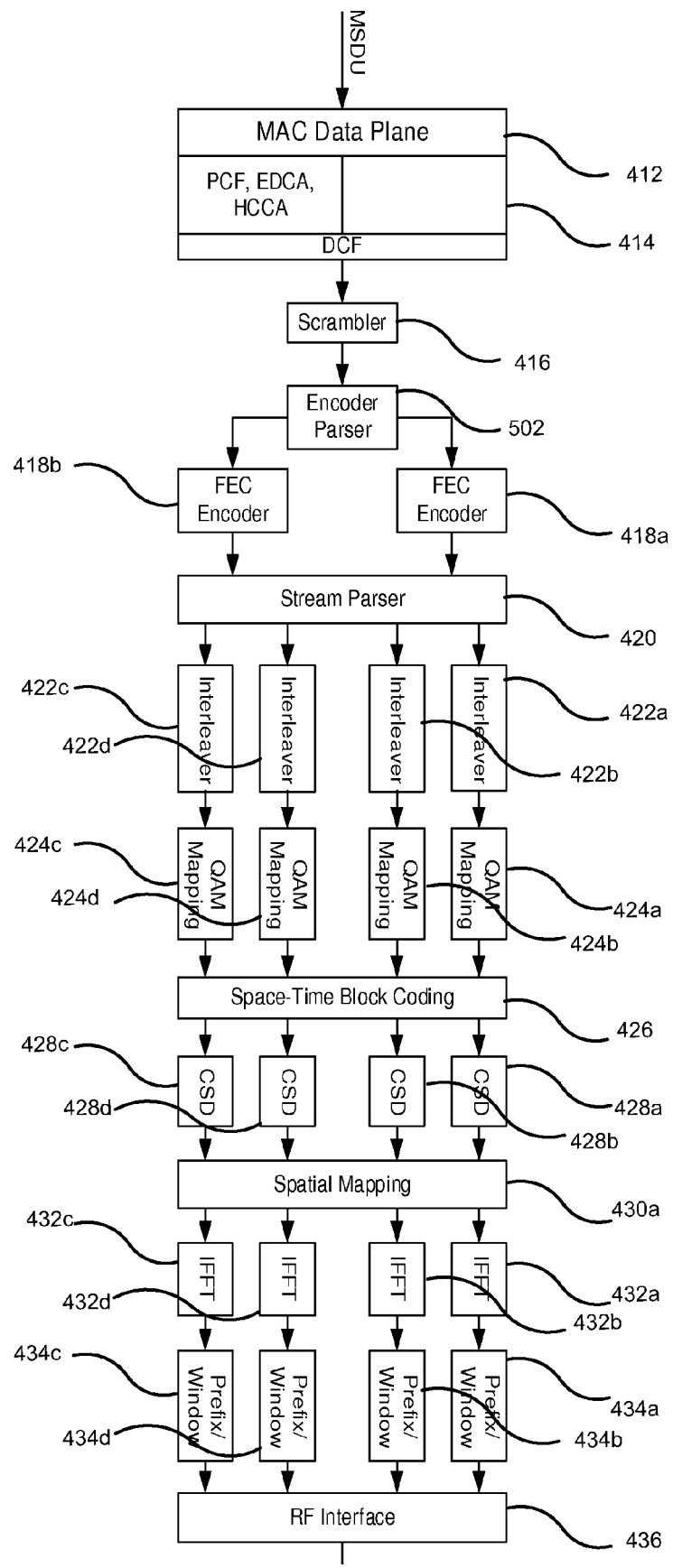
FIG. 5 shows a block diagram according to an embodiment of the present invention.

Referring now to FIG. 5, a further embodiment of the present invention is described. This embodiment allows to provide in one mode a Normal-MIMO operation wherein all chains are part of the same MIMO transmission. In another mode, the same components or entities utilized in the Normal-MIMO operation are utilized to provide a bundling of physical channels. As will be outlined below in more detail, in the bundling of physical channels one or more of the physical channels may be MIMO operated.

In this embodiment, the processing chain in the baseband is similar for the MIMO operation and the bundling mode operation. However, in the bundling mode, instead of transmitting in the MIMO operation the data in the same channel over multiple spatial paths to the antennae of the receiver, the data is distributed in the bundling mode in different channels to the receiver antennae thereby bundling these different physical channels to one logical channel.

FIG. 5 shows a transmitter as distinguished to the transmitter shown in FIG. 4 with a single data stream processing upstream of the error correction encoding. As can be seen, a single MAC data plane entity 412, a single MAC extent entity 414 and a single scrambler 416 is provided allowing in the normal MIMO and the bundling mode the common processing for both physical channels. The data stream from the scrambler is then passed to an encoder parser 502 parsing the data stream to two error correction encoders 418*a* and 418*b*. A stream parser 420 is then provided which distributes the encoded data streams from each of the encoders 418*a* and 418*b* to the four chains. The stream parser 420 is configurable to distribute the data stream according to each mode the transmitter is operating currently. The transmitter 500 can be operated for example in the normal MIMO mode utilizing all 4 chains for MIMO operation in one physical channel or in the bundling mode utilizing one pair of chains for providing MIMO operation on a first physical channel and utilizing the other pair of chains for utilizing MIMO operation for the other physical channel. In this case, some of the chains serve together to provide for a physical channel MIMO operation. In the bundling mode also one operation is configurable wherein all chains are assigned to different physical channels. This means that in this mode each of the physical channels is operated independently from the others. The interleaver entities 422*a*-*d* are then provided to interleave the data followed by the QAM mapping entities 424*a*-*d*. A STBC entity 426 receives the data streams from each of the QAM mapping entities. The STBC entity can either be configured to provide STBC processing for one physical channel or to provide STBC processing over multiple physical channels. For example, if one pair of chains is assigned to one physical channel and the other pair of chains is assigned to another physical channel to provide for each physical channel a STBC operation with two chains, the STBC entity 426 is configured to provide STBC processing separate for each pair of chains. If for example one chain is assigned to one physical channel and the other three chains are assigned to another physical channel with STBC operation, the STBC entity 426 may be configured to provide STBC processing for the three chains operating in the same physical channel while the one channel assigned to the other physical channel may not require STBC processing. Downstream of the STBC entity 426, the CSD entities 428*a-d* are receiving the streams from the STBC entity 426. After providing CSD processing, the CSD entities 428*a-d* pass the streams to a spatial mapping entity 430*a* which may be configurable similar to the STBC entity 426 to provide a common spatial mapping processing for chains operating in the same physical channel or for chains in different physical channels. IFFT entities 432*a*-432*d* and Prefix/window entities 434*a-d* are then processing the data streams. The RF interface 435 receiving the data stream from the Prefix/Window entities 434*a-d* provides the baseband signal to a radio circuit to modulate the baseband signal onto the carrier signal or carrier signals. It is to be noted that in the normal MIMO operation utilizing all 4 chains, the carrier signal is the same for each of the 4 chains, while in the bundling operation base band signals of chains assigned to different physical channels are modulated on carrier signals with different frequencies. This challenges the radio circuit to provide mixers for each chain which are capable of providing in the normal MIMO mode mixing for all chains with the same frequency and in the bundling mode mixing such that at least some of the baseband signals are mixed with carrier signals of different frequencies.

Figure 6:
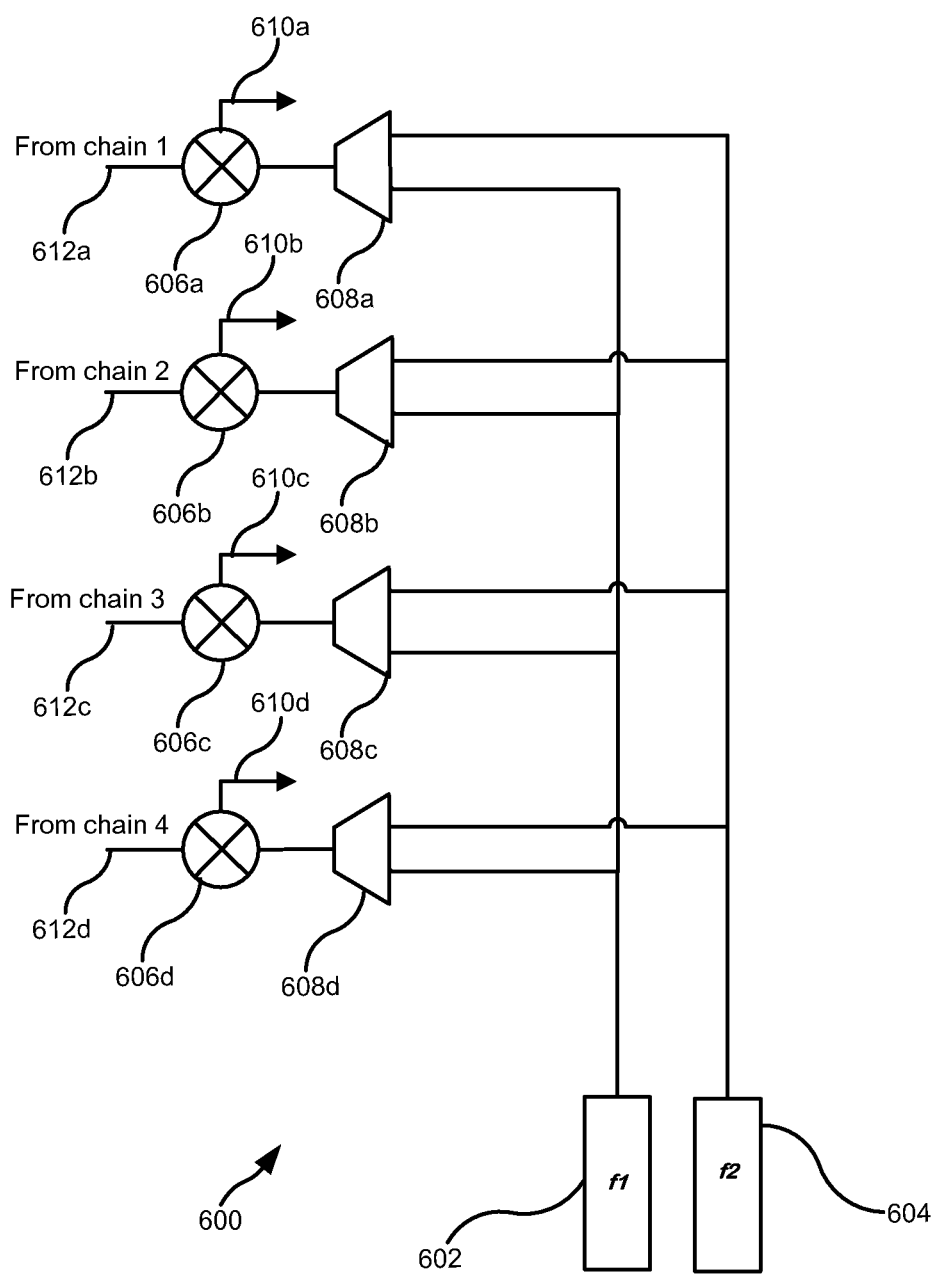
FIG. 6 shows a circuit diagram according to an embodiment of the present invention.

One embodiment of a radio circuit which can be configured to provide MIMO operation for all 4 chains as well as bundling of two different physical channels is shown in FIG. 6. The radio circuit 600 comprises a first signal generator 602 operating with a first frequency f1 and a second signal generator 604 operating with a second frequency f2. The output of the first signal generator 602 is coupled to first inputs of a plurality of multiplexers 608*a-d*. The output of the second signal generator 604 is coupled to second inputs of the plurality of multiplexers 608*a-d*. The outputs of the plurality of multiplexers are coupled to first inputs of a plurality of mixers 606*a-d*. Second inputs 612*a-d* of the plurality of mixers 606*a-d* are coupled to the plurality of chains to receive the baseband signal from the chains. The output of each mixer is coupled to a respective antenna to transmit the modulated signal.

The radio circuit is fully configurable to provide based on a configuration signal to each of the mixers 606*a-d* selectively the frequency f1 or f2. In Normal-MIMO mode, all of the mixers may either receive the carrier signal from generator 602 to modulate all four baseband signals with frequency f1 and provide MIMO operation with frequency f1 or all of the mixers may receive the carrier signal from generator 604 to modulate all four baseband signals with frequency f2 and provide MIMO operation with frequency f2. In bundling operation, some of the mixers may receive the carrier signal from the first generator 602 to provide transmission on a first physical channel with frequency f1 and some others of the mixers may receive the carrier signal from the second generator to provide the transmission on the second physical channel with frequency f2. The configuration is fully flexible, allowing for example in one configuration to combine two chains to transmit on the first physical channel with 2×2 or 2×N MIMO and to transmit on the second physical channel with 2×32 or 2×N MIMO or to transmit in one configuration such that 3 channels are combined to transmit on the first physical channel with frequency f1 in 3×3 or 3×N MIMO and one channel is transmitting in non-MIMO operation on the second physical channel with frequency f2. N may hereby indicated a placeholder for any integer number. Furthermore, by adding additional generators for generating other frequencies, the system may be configurable to provide 4 different frequencies to the mixers allowing to bundle 4 physical channels transmitting in non-MIMO operation. It is further to be understood that the generators 602 and 604 as well as the above described additional generators may be provided tunable allowing not only to provide a fixed frequency but to tune the carrier signal provided by each of the generators to different frequencies.

The person skilled in the art will recognize that above described architecture allows to provide a fully-flexible transceiver which is capable to provide a full-MIMO operation wherein the chains are utilized in common for a MIMO operation, a bundled MIMO operation wherein transmission is provided on different physical channels, i.e. different frequencies but each of the physical channel uses a MIMO operation, an operation wherein one physical channel operates in MIMO and the other physical channel is not operating in MIMO and a full-non-MIMO bundling operation wherein each of the physical channels is bundled and operates not in MIMO. It is further to be noted that the embodiment described in FIGS. 5 and 6 can be combined with the embodiment described in FIG. 4. In this case, the entities which are shown in FIG. 5 as single entities are configurable also to provide the independent operation as described in FIG. 4. This allows to utilize the system with fully independent bundling having the advantage of transmitting on each physical channel whenever a channel is available as well as allowing the normal MIMO operation for all channels.

It is further to be understood that the number of channels described above is only of exemplary character and that any other number of channels can be provided for each of the above described operations. In other words, the number of channels may be 2, 3, 4, 5, 6, 7, 8, 9, 10 etc. Furthermore, the number of chains described above is only of exemplary character and any other number of chains may be utilized in other implementations. In other words, the number of chains may be 2, 3, 4, 5 etc.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of transmitting a data stream in a communication network from a transmitter to a receiver comprising:
    bundling at least a first physical channel and a second physical channel on which data is transmitted, wherein the bundling of the first physical channel and the second physical channel comprises:
        fragmenting data units of the data stream;
        separating the data stream comprising the fragmented data units into a first partial data stream and a second partial data stream, wherein the separating into first and second partial streams is provided between a MAC layer and a layer 3 (Network Layer) of an OSI model or at a sublayer higher than a MAC extent sublayer;
        providing for the first and second partial data streams an indication to indicate a position in the data stream;
        transmitting the first partial data stream on the first physical channel from the transmitter to the receiver and the second partial data stream on the second physical channel from the transmitter to the receiver, wherein transmitting of the first partial data stream on the first physical channel is independent from transmitting the second partial data stream on the second physical channel, the first partial data stream provided by a first MAC entity and the second partial data stream provided by a second MAC entity being scheduled for transmission independently; and
        aggregating the first and second partial data streams at the receiver to retrieve the data stream, wherein aggregating the first and second partial data streams comprises: aggregating the first and second partial data streams based on the indication.

2. The method according to claim 1, further comprising:
    determining whether the first physical channel is occupied by a data transfer of another transmitter of the network; and
    transmitting data of the first partial data stream on the first physical channel when it is determined that the first physical channel is not occupied.

3. The method according to claim 2, wherein data is transmitted every time the first physical channel is not occupied.

4. The method according to claim 2, further comprising:
    determining whether the second physical channel is occupied by a data transfer from another transmitter of the network; and
    transmitting the first partial data stream on the first physical channel independent whether the second channel is occupied and transmitting the second partial data stream on the second physical channel independent whether the first physical channel is occupied.

5. The method according to claim 2, wherein the determining whether the first and second physical channel is occupied is contention window based.

6. The method according to claim 2, wherein data transmitted on the first physical channel are fragmented data units and wherein determining whether the first physical channel is occupied is provided before each transmission of a fragmented data unit.

7. The method according to claim 1, wherein the first physical channel is a physical channel of a shared transmission medium.

8. The method according to claim 1, wherein the first and second physical channel are selected from a group including a frequency channel of a plurality of frequency channels, a frequency band of a plurality of frequency bands, a wired transmission line, a timeslot.

9. The method according to claim 1, wherein at least one of the first and second physical channel is selected from a group including a WLAN channel of a plurality of WLAN channels and a WLAN frequency band of a plurality of WLAN frequency bands.

10. The method according to claim 1, further comprising transmitting the data stream in a non-independent transmission from the transmitter to the receiver, wherein in the non-independent transmission data are transmitted in the first and second physical channel only when both the first and second physical channel are not occupied by data transmission from at least one other transmitter of the network.

11. The method according to claim 1, wherein the first physical channel or the second physical channel utilize MIMO operation.

12. A transmitter comprising:
    an input to receive a data stream to be transmitted from the transmitter to a receiver;
    a bundling entity to fragment data units of the data stream and to separate the data stream comprising the fragmented data units into at least first and second partial data streams and to distribute the partial data streams to a first MAC entity and a second MAC entity,
    wherein the bundling entity is provided in a MAC layer above a MAC-extent sublayer or between the MAC layer and layer 3 of an OSI model (Network Layer);
    the first MAC entity being configured to provide a part of the MAC processing for the first partial data stream; and
    the second MAC entity being configured to provide a part of the MAC processing for the second partial data stream;
    wherein the first and second MAC entities are further configured to provide the part of the MAC processing in the first MAC entity independent from the part of the MAC processing in the second MAC entity;
    wherein the transmitter is configured to provide scheduling of the first partial data stream for transmission in the first MAC entity independent of the scheduling of the second partial data stream for transmission in the second MAC entity.

13. The transmitter according to claim 12, wherein the first and second MAC entities are configured to provide at least MAC-extent processing in the first MAC entity independent from MAC-extent processing in the second MAC entity.

14. The transmitter according to claim 12, wherein the transmitter is capable to transmit the first partial data stream over the first physical channel when the second physical channel is occupied.

15. The transmitter according to claim 12, wherein the bundling entity is configured:
to determine whether the data transmission capacity of one of the first physical channel or the second physical channel is below a first threshold and
based on the determination that the capacity of the one of the first or the second physical channel is below the first threshold to perform at least one of the following:
eliminate the one of the first or the second physical channel from the bundling such that the transmitter operates in a non-bundling mode;
initiate reactivation of the one of the first or the second physical channel; and
replace the one of the first or the second physical channel by another physical channel.

16. A receiver comprising:
a first input to receive from a first physical channel fragmented data units of a first partial data stream to be transmitted from a transmitter to the receiver;
a second input to receive from a second physical channel fragmented data units of a second partial data stream;
a first MAC entity to provide a part of the MAC processing for the first partial data stream;
a second MAC entity to provide a part of the MAC processing for the second partial data stream;
a bundling entity, wherein the bundling entity is configured to combine at least the first and second partial data streams into a single data stream, wherein the first and second MAC entity are configured to provide the part of the MAC processing in the first MAC entity independent from the part of the MAC processing in the second MAC entity, wherein the bundling entity is provided in a MAC data plane or between a MAC layer and a layer 3 (Network Layer),
wherein the bundling entity is further configured to de-fragment the fragmented data units of the single data stream.

17. The receiver according to claim 16, further comprising, a buffer to store at least one fragmented data unit received via the first or second physical channel to compensate for time delays when the first or second channel has been occupied by another transmitter.

18. The receiver according to claim 16, wherein the bundling entity is configured to receive a request and to perform one of the following:
decoupling the one of the first or the second physical channel from the bundling entity based on the request and
coupling the bundling entity to a new physical channel based on the request.

19. The receiver according to claim 16, further comprising:
a buffer to buffer first and second partial data streams transmitted over the first and second physical channel to compensate for delay in the transmission;
a sequence analyzer to analyze identifications of the first and second partial data streams and to determine positions of the first and second partial data streams in the data stream; and
wherein the bundling entity is configured to aggregate the first and second partial data streams based on the determined positions of the first and second partial data streams.

20. A communication system comprising:
a transmitter, the transmitter comprising:
a first input to receive a data stream to be transmitted;
a first bundling entity to fragment data units of the data stream and to separate the data stream comprising the fragmented data units into at least first and second partial data streams and to distribute the first and second partial data streams to a first MAC entity and a second MAC entity, wherein the first bundling entity is provided in a MAC layer above a MAC-extent sublayer or between the MAC layer and a layer 3 (Network Layer) of an OSI model;
the first MAC entity being configured to provide at least a part of the MAC processing for the first partial data stream; and
the second MAC entity being configured to provide at least a part of the MAC processing for the second partial data stream;
wherein the first and second MAC entities are further configured to provide a part of the MAC processing in the first MAC entity independent from a part of the MAC processing in the second MAC entity;
a receiver, the receiver comprising:
a second input to receive from the first physical channel the first partial data stream transmitted from the transmitter to the receiver;
a third input to receive from the second physical channel the second partial data stream;
a third MAC entity to provide a part of the MAC processing for the first partial data stream; and
a fourth MAC entity to provide a part of the MAC processing for the second partial data stream;
a second bundling entity, wherein the second bundling entity is configured to combine at least the first and second partial data streams into a single data stream, wherein the third and fourth MAC entities are configured to provide the part of the MAC processing in the third MAC entity independent from the part of the MAC processing in the fourth MAC entity,
wherein the second bundling entity is provided in a MAC data plane or between a MAC layer and a layer 3 (Network Layer),
wherein the second bundling entity is further configured to aggregate the fragmented data units of the single data stream.

* * * * *